Sept. 13, 1938.  L. L. DE KRAMOLIN  2,129,730
SPACE DISCHARGE DEVICE
Filed June 5, 1935  2 Sheets-Sheet 1

INVENTOR.
Leon Ladislas de Kramolin
BY
Karl Nau
ATTORNEY.

Sept. 13, 1938.   L. L. DE KRAMOLIN   2,129,730
SPACE DISCHARGE DEVICE
Filed June 5, 1935   2 Sheets-Sheet 2

INVENTOR.
Leon Ladislas de Kramolin
BY
ATTORNEY.

Patented Sept. 13, 1938

2,129,730

UNITED STATES PATENT OFFICE 2,129,730

SPACE DISCHARGE DEVICE

Leon Ladislas de Kramolin, Berlin-Wilmersdorf, Germany

Application June 5, 1935, Serial No. 25,052
In Germany April 7, 1932

18 Claims. (Cl. 250—27.5)

The present invention relates to novel means and methods for manufacturing and operating space discharge tubes for amplifying, rectifying, or generating electric currents including one or more heated elements such as thermionic cathodes, and more particularly to a novel means and methods for heating such cathodes.

One object of the invention is the provision of novel means and methods for manufacturing equi-potential cathodes, particularly cathodes formed according to the distillation method.

In such distillation cathodes, which can be produced for instance by the azide or thermite process, it is necessary to "form" the cathodes after the application of vaporized metallic barium or the like. The forming process in this case is probably intended to cause an alloy to be formed from the vaporized barium and the carrier material, for instance, nickel, copper, platinum, silver, gold, etc., in which case, on progressive formation, a thin (probably monatomic) barium layer forms on the surface of this alloy, which has an intense emission-promoting effect. To effect this formation, it is necessary to heat the cathode considerably more intensely than is necessary in subsequent normal operation.

For the above reason, it has hitherto been difficult to produce indirectly heated cathodes by the distillation process. Owing to the heat gradient which arises between the actual filament in the interior of an indirectly heated cathode and the external active cathode surface, it is necessary to heat the filament itself to a very high temperature if it is desired to obtain the high temperature at the cathode surface required for the forming process. This is so particularly when, as for instance in saturating tubes, pronounced saturation characteristics are required for producing high alternating current resistance for relatively low direct current resistance.

If the filament of an indirectly heated cathode is heated to such a temperature that the cathode temperature which is required for forming is attained or nearly so, considerable vaporization of the filament takes place. A strong tendency to become brittle is then exhibited, for instance, in tungsten filaments, causing a large amount of waste. A further drawback is due to the tungsten tending to combine with the material of the insulating body such as zirconium oxide, porcelain, magnesia or the like, if such is provided between the cathode and the cathode heating body. Furthermore, tungsten vapor or vapors of another material forming the filament may be deposited in the pores of the insulating body (this insulating body frequently undergoing a dark coloration), thus causing a reduction of the insulating resistance between the heating body and cathode surface with detrimental consequences, such as leakage currents, hum noises, etc. Heating of the cathodes by the use of high frequency induction from a heating coil is not possible without difficulty as in such a case the metallic parts surrounding the cathode, for instance, the control electrodes and anodes are simultaneously heated. This simultaneous heating is however detrimental since the materials used for the barium vaporization are usually provided on one of these electrodes and thus their heating would again vaporize fresh barium onto the cathode, whereby the forming process is disturbed or else, even if the initial material of the cathode activation was not originally provided on the other electrodes, the latter has been deposited during the vaporization process to a certain extent on the other electrodes (control electrodes and anode) and also on the other metallic parts and, on re-heating, is again vaporized and can thus reach the cathode.

Accordingly, a further object of my invention is the provision of a means and method which allows of heating the cathode of a discharge device to a desired temperature such as required for forming in the example described without appreciably heating the other electrodes and metallic parts and without causing an overstrain of the heating filaments of the cathodes.

A further object of the invention is the provision of an indirectly heated cathode, particularly for such tubes wherein a minimum possible capacitative influence of the heating body on the cathode or other electrodes is to exist.

Such cathodes may be employed for instance in electron discharge tubes for use in arrangements such as are described in my copending patent application Serial No. 660,279, filed March 10, 1933, for improvements in "Thermionic amplifiers" wherein the anode of one tube acting as an amplifier or rectifier is directly connected to the cathode of a further tube, and this further tube either produces special amplifying effects or else acts as a filtering tube by operating with a saturated discharge or by securing an effect similar to a saturation characteristic by suitable control of the discharge.

Further objects and aspects of the invention will become more apparent from the following detailed description taken with reference to the accompanying drawings wherein I have illustrated a number of practical embodiments of cathode heating structures in accordance with my invention.

Referring to the drawings:

Fig. 1 shows one form of an indirectly heated cathode structure especially suited for saturation cathodes produced by the distillation method in accordance with the invention.

Figure 13:
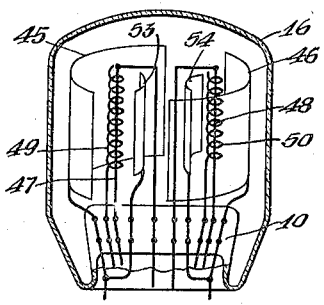
Figure 14:
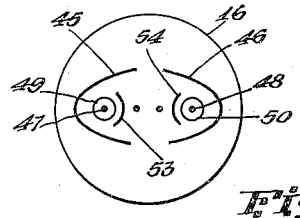
Figure 11:
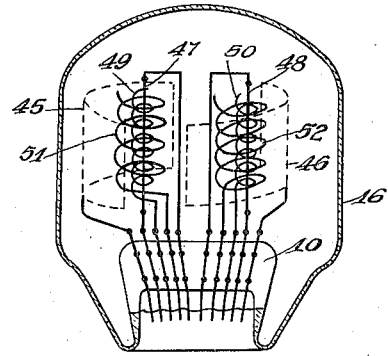
Figure 12:
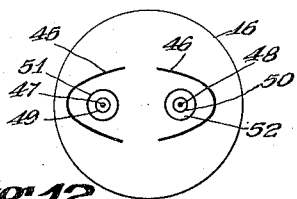

Figs. 11 and 12 illustrate vertical and horizontal cross sectional views of a further modification of a tube construction according to the invention operating on the radiation heating principle; and, Figs. 13 and 14 show a modification in vertical and horizontal cross section of a tube construction of the type described by Figs. 11 and 12.

Similar reference numerals identify similar parts throughout the different views of the drawings.

According to one feature of the invention, I propose to heat the cathode by radiation whereby the heating body effecting the radiation may be provided at a relatively great distance from the cathode and the heat radiated from the heating body is concentrated on the cathode by special means, for instance, by reflector-like structures. The cathode itself in this case is so constructed that it has the smallest possible mass so that even with a relatively poor efficiency of the heat transmission it can still be heated by radiation to a sufficiently high temperature. Furthermore, the cathode should be activated with materials which exhibit an adequate emission even at a low cathode temperature. As such types of cathodes, the well known oxide cathodes and the distillation cathodes above described may be employed, preferably with electro-positive metals as the activating material, such as barium, caesium, strontium, calcium, potassium and the like, or compounds of these materials, particularly the oxides.

It is understood that the above described principle of heating thermionic cathodes or other heated elements in a space discharge device by radiation has other uses and advantages, especially for all such cases where it is desired to keep the heating element at a sufficient distance from the cathode proper, such as for preventing disturbing capacitative effects therebetween as in the case of very high operating frequencies such as in short wave and ultra short wave systems.

For cathodes in saturating tubes, oxide cathodes are less suited since it is difficult to secure saturation phenomena with such cathodes, so that for this purpose primarily distillation cathodes are to be preferred which have further advantages in control tubes operated outside the saturation range or within the space charge range and require a minimum of heat supply to obtain a satisfactory emission. However, since oxide cathodes and in particular distillation cathodes, involve the use of high temperatures for the forming operation; that is, temperatures which are generally higher than those which can be supplied to the cathode by indirect means, the cathodes are, according to the invention, provided with means so that they may be directly heated during the forming process. In this case, in order to avoid the provision of supply leads for the heating during the forming process, the cathodes are preferably connected for this purpose through a thin conductive bridge to another electrode insulated from the cathode during operation of the tube, the connection being broken subsequently by fusion of the conductive bridge by a brief passage of high intensity current. It is conditional for this, of course, that this connecting bridge should constitute the electrically weakest part of the circuit. This can be obtained for instance by attacking a wire forming the cathode body at the point at which the subsequent separation is desired by an acid or the like to dissolve the metal at this point.

Referring to Figure 1 of the drawings, I have shown at 1 a heater or filament bent upon itself in hairpin fashion and embedded in the cathode insulating body 2 being of cylindrical shape and carrying on its outside the cathode 3 proper. The cathode structure may be mounted in any well known manner in an evacuated vessel or tube 16, such as by means of supporting leads 6—9 sealed in the stem or press 10 forming part of the tube. Leads 6 and 7 serve as current leads for the cathode 3 proper to be described and leads 8 and 9 may serve simultaneously as supports for the heater 1. The cathode 3 is shown to be constructed in strip or wire form and wound around the cathode insulating body 2 in such a manner that a cathode surface almost completely covering the cathode insulating body is obtained. Care is taken however by providing small spaces between the individual turns or by providing insulation therebetween, that an auxiliary heating current introduced at the supply terminals 4, 5 actually flows through the leads 6 and 7 and the whole of the turns of the cathode 3, so that the cathode body can be brought to temperatures which are sufficient for the forming process without excessive currents requiring expensive leads and terminals. As is understood, the heating may be effected either by means of an auxiliary current alone or in conjunction with the normal heating by the heater 1 without overloading the latter. After forming has been effected, the terminals 4 and 5 of the leads 6 and 7 may be connected together as shown by the dotted lines in the drawings, in order to maintain the character of an equi-potential cathode as much as possible.

Figure 2:
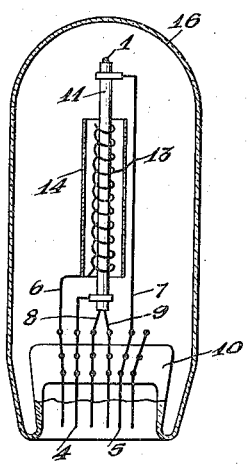
Fig. 2 shows a modification of a tube according to Fig. 1.
Figure 4:
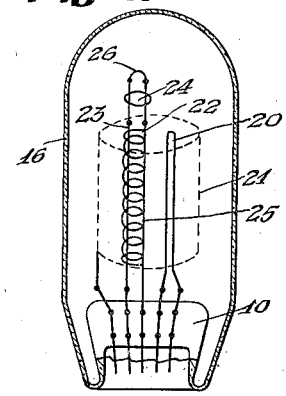

A further constructional example of a cathode according to the invention is given in Fig. 2. In this case the cathode consists of a closed tubular body 11 connected at its lower and upper end to the supply leads 6 and 7. With such a construction, it is advisable to give the cathode tube 11 the smallest possible wall thickness in order to enable the heating of the cathode to an adequate extent by Joulian heat without using very high current intensities requiring expensive current leads. Items 13 and 14 illustrate cylindrical grid and anode electrodes surrounding the cathode concentrically in a manner well known.

Figure 3:
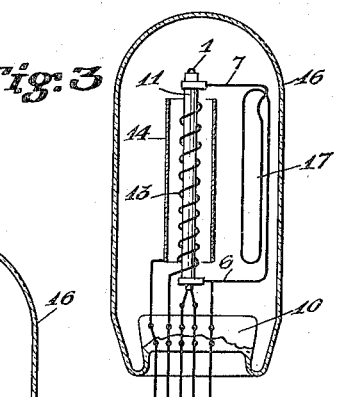
Fig. 3 represents a further modification of a cathode heating structure of this type.

A further form of construction of a cathode according to the invention is shown in Fig. 3 wherein a special lead for the cathode auxiliary heating is dispensed with. In this case, the two ends of the cathode 11 are connected to the supply leads 6 and 7, which form a closed single or multi-layer coil or loop 17 whereby by disposing a flat heating coil opposite the loop or coil 17, the necessary heating energy may be applied inductively, this loop or coil being furthermore so arranged (for instance near the glass wall) that the inducing field acting on it has no appreciable effect on the other metallic parts. For this reason it is advisable to arrange the axis of the loop or coil 17 and the axis of the other tube elements which are likely to be heated by induction, perpendicularly to one another. Furthermore, the loop or coil 17 preferably consists of a material of higher conductivity than the cathode. Thus for instance, the cathode may consist of platinum or nickel while the loop 17 consists of copper or the cathode may be of copper and the loop may be made of silver, or else the loop may be designed with a larger cross-section than the cathode or the above mentioned selection of materials may be used in combination with the dimensioning referred to in order to prevent excessive heating of the loop 17 during the forming process of the cathode, thus preventing the heat from effecting the nearby glass wall of the tube and the barium deposited on the loop from being vaporized and interfering with the forming process, as pointed out hereinbefore.

The above described method is of course not limited exclusively to the manufacture of distillation cathodes, though in this case it offers special advantages, but can also be employed for forming cathodes activated in other ways, for instance, thoriated cathodes or cathodes treated with barium oxides and the like.

Figure 4:
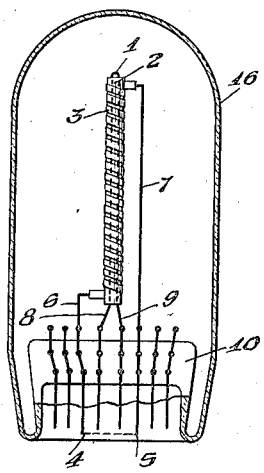
Figs. 4 and 5 represent both vertical and horizontal cross sectional views of a thermionic tube construction utilizing the principle of supplying the cathode heat by radiation in accordance with another object and feature of the invention.
Figure 5:
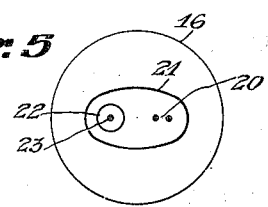

Figs. 4 and 5 illustrate an embodiment of the invention as applied to a cathode adapted to be heated by radiation in accordance with another feature of the invention. Item 20 denotes a heating body such as a heating wire bent in the form for instance of a hairpin as shown. Item 21 is an anode, 22 is a grid, 23 the cathode in the form of a straight wire, and 24 a glass bridge serving to support the cathode wire against the grid carrier 25 and carrying a lead 26 connecting the cathode and grid carrier which forms the thinnest cross-section of the circuit comprising the cathode lead, cathode wire 23, lead 26, grid carrier 25 and grid supply lead. The wire 26 must of course not be very much thinner than the cathode wire since otherwise the lead 26 would fuse before the required temperature for the forming process is obtained. The lead 26 should also have a minimum radiation and heat loss and the smallest possible heat inertia which may be obtained by any suitable means in such a manner that after the forming of the cathodes has been completed the lead 26 can be fused by a current impulse of sufficient intensity without heating the cathode to a temperature as to affect its activated surface. The cathode 23, on the one hand, and the heater body 21 on the other, are so arranged and firmly held by suitable constructional elements, such as by means of insulating supports, bridges, glass rods, mica plates or the like, that they are situated at the two foci of the elliptical space surrounded by the anode body 21, so that the entire energy radiated from the heater 20 is concentrated at the cathode 23. In order to obtain favorable conditions, it is desirable to make the radiating surface of the body 20 large in comparison with the surface of the cathode 23 which is easily possible since the cathode 23 need only consist of a single thin wire. Further means for ensuring favorable radiation from the heating body 20 are described in the course of the further description.

It is by no means necessary that, as is shown in Figs. 4 and 5, the anode should constitute the reflector, but that any desired reflector may be used for this purpose. Thus, for instance, any other constructional element within the tube may be used to form the reflector. Furthermore, the glass or possibly metal vessel surrounding the electrodes and enclosing the vacuum space may be formed as the reflector. In the latter case, if the glass vessel itself forms a reflector, the powdered magnesium or the like substance usually provided for the gettering can be used as a mirror or reflecting surface for the heat rays. Moreover, the reflector may be combined with any other electrode other than the anode as in the example shown, such as for instance in the form of a screen for preventing back flash or retro-ignition in gas-filled tubes.

Figure 6:
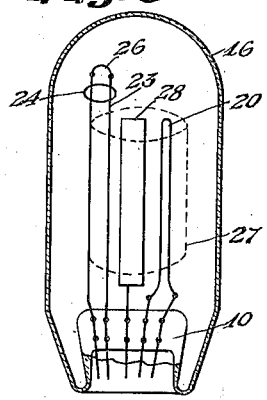
Figs. 6 and 7 represent vertical and horizontal cross sections of a modified construction of a discharge tube according to Figs. 4 and 5.
Figure 7:
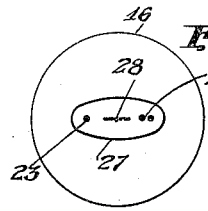

A further constructional example presenting various advantages is illustrated in Figs. 6 and 7. In these figures, the elliptical reflector forms the control electrode 27 in which case the control electrode acting as a reflector may either be situated within the vacuum space of the tube or it may be arranged as an external control electrode on the outside of the tube. In the last mentioned case, the reflector may moreover be arranged as a coating on the glass container which may have an elliptical cross-section, or else the glass container may be somewhat narrower than the control electrode constructed in the form of a reflector, thus making it easy to adjust the system comprising the heater 20 and cathode 23 within the reflector in such a manner that the two elements are actually at the two foci. Item 28 represents the anode which in this case is constructed as a flat plate in order to present the smallest possible obstruction to passage of the thermal rays from the heater 20 to the cathode 23. In addition, this arrangement has a number of electrical advantages which, among others, reside in the fact that variations in the trans-conductance which otherwise easily arise in such tubes, in particular in the range of higher controlling and anode voltages, are minimized. Item 24 again represents a glass rod and 26 the fusible connecting wire serving, after completion of the cathode forming, to break the connections between the cathode and control cylinder 27 as described before. The seals in the pinch of the tube are preferably also arranged in such a manner that the low capacity arising, owing to the construction of the tube between the heating body and the other parts of the tube particularly the cathode, is retained, the seal for the heating body being arranged at as far a distance as possible from the seals for the other electrodes.

The exact adjustment of the heater and cathode at the two foci of the ellipse, which can be easily effected in particular where the reflector is provided outside the tube as described above, is only necessary when comparatively little heating energy is available. If, however, the heating energy is increased and the radiating surface of the heating body is made larger, an exact maintenance of this relation is not necessary. It is also not absolutely necessary to retain the form of a pure ellipse for the cross-section of the reflector, but any other form of reflector may be employed, it being however important to direct the heat radiation in such a manner that a sufficient transfer of heat takes place by radiation over a relatively large distance desirable in order to insure a small capacitative influence between the electrodes concerned.

In constructions of this type it is furthermore advantageous to give the heater a larger surface than the heated cathode by the use of simple means whereby it is relatively easy to impart the necessary emission temperature to the cathode. Thus in the constructional example herein described, care is taken that the parts obstructing the radiation project as little as possible into the path of the rays between the heater and the cathode.

Since, in contra-distinction to the usual indirectly heated cathodes, an increase of the surface of the heating body does not necessarily entail an increase of the emitting cathode surface and increased cathode radiation whereby a considerable energy demand arises in order to keep the cathode at a certain temperature, it is possible in a simple manner in this case to provide cathodes for operating with high voltages; that is, for instance, cathodes for direct connection to an ordinary lighting network or to larger fractions of the network voltages (about $\frac{1}{5}$th of the lighting voltage). Since the heating bodies, as has already been mentioned, are situated at relatively large distances from any of the electrodes on which they could exert any injurious effect by capacitative influence, there is no danger even when energizing such heating bodies with high heating voltages that the disturbing noises will substantially increase even though no attention is given to reducing the effect of magnetic fields set up by the heating body. This reduction can however easily be effected by arranging opposite current carrying parts of the heating body in parallel relation (hair-pin type heater as shown or use of double spiral type heater well known in the art), or by covering the heating body with magnetically screening material.

If the heating body is heated to such a temperature that it can itself emit and thereby influence the function of the other electrodes, it is advisable to apply to it a positive potential with reference to the other electrode or to give it at least anode potential whereby disturbances can be avoided. Furthermore, it is advisable to provide the heating body with a coating effective in promoting radiation, such as a coating of carbon which has the further advantage of suppressing the emission.

Since, as has already been previously mentioned, it may be desirable that the heating body should have a larger surface than the cathode itself, the mass of the heating body may be increased by coating it with suitable materials. This is of advantage in the case of heating bodies energized by alternating current with a view to increase the thermal inertia. The coating material may be either insulating or else metals may be used for the covering, it being necessary in the latter case to insulate the heating body from the metal coating in order to prevent short circuiting through the covering metal. However, since on the other hand no insulation from the other electrodes is necessary and since the voltage of the heating current can be very low, a thin oxide layer on the heating body itself or on the covering metal is sufficient to prevent a short circuit between the heating body and the covering metal. For instance, the heating wire or filament may be used coated with aluminum by means of suitable known methods such as by spraying, a dusting process or by applying with aluminum foil which is then converted by oxidation into an insulating aluminum oxide. A further metallic coating may then be applied to this insulating oxide layer.

Alternatively, the metallic radiating body can be arranged on the actual heating wire, the filament being unaltered per se, by spirally winding another wire provided with an insulated covering produced by any of the above described methods on the main heating filament. In the latter case the oxidation process can either be applied before winding or else the wire may first be provided with a metallic aluminum covering and oxidation effected subsequently, in which case breaking of the insulation during winding or unwinding is avoided. Apart from securing a larger surface by the metallic wire wound on the actual heating wire, a more favorable heat distribution along the heating wire may be obtained. If the spiral wire is wound on the heating wire in such a manner that it does not cover the full length of the heating wire but starts at a point spaced about 1 to 2 mm. from the point where the heating wire is welded to the heating wire supply leads at each end thereof; that is, if only the central region of the heating wire is wound with the radiating wire, the heating body is thickened at that region while near the supply leads it only has the temperature of the actual heating wire. As a result a stronger radiation takes place from the central region of the heating wire in such a manner that by conduction of the heat to the heating wire supply leads the temperature reducing influence of the radiating body is rendered ineffective and an approximately uniform temperature distribution over the entire length of the heating filament is obtained.

It is possible to develop further on these lines by making the pitch of the wound spiral smaller towards the center and greater towards the ends and leaving the ends entirely unwound, as above described. The use of this arrangement is, moreover not limited to the present subject of the invention, but may be used with certain modifications in all cases where special importance is attached to the provision of a uniform temperature distribution over the entire length of a filament, such as for instance, in the case of normal indirectly heated cathodes or even in the case of directly heated cathodes. Since to a certain extent the temperature level required in the heating body can be made somewhat lower with a larger heating body surface, as has already been discussed, it is also possible in such tubes according to the subject of the invention to dispense with a metallic heating body and to substitute therefor ceramic or other types of heating bodies in a most simple manner such as for instance carbon rods, Silite rods, and the like which are particularly useful for operation with higher heating voltages. If relatively high voltage drops in the heating body are employed, care should be taken, if disturbing emission is to be feared especially in the case of distillation cathodes, to prevent interference with the proper function of the tube either by means of an insulating coating provided on the heating body, by electric screening, or by applying a sufficiently high positive potential to all the parts of the heating body likely to give rise to disturbing emission.

Figure 8:
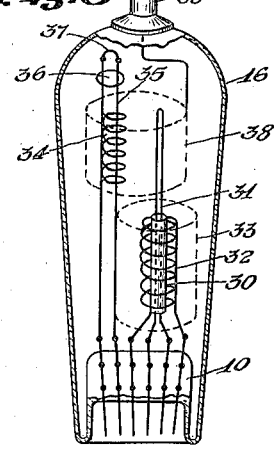
Fig. 8 illustrates a further modification of a discharge device according to the invention as applied to a composite tube structure comprising more than one discharge system disposed within a single envelope.

Referring more particularly to the construction shown by Fig. 8, this illustrates a composite tube structure comprising two discharge sections with the anode of the first section being directly connected to the cathode of the second section. A composite tube of this type may for instance be used in a system as described in my above mentioned copending application for amplifying, rectifying, or producing electric oscillations, but it is understood that the inventive principle may be embodied in any other type of composite tube structure comprising a plurality of separate discharge systems disposed in a common envelope and connected in any desired manner. In the specific example according to Fig. 8, I have shown a common envelope such as a glass bulb 16 having a first discharge system comprised of the cathode 30 heated by a heater wire shown at 31 in a manner as is customary with indirectly heated cathodes and as described hereinbefore in connection with the previous illustrations. I have furthermore shown the cathode 30 surrounded by a grid 32 of spiral shape and a cylindrically shaped anode of usual construction indicated at 33. The electrodes may be provided with suitable leads or supports passing through the pinch or press 10 of the tube and may be connected to a base provided with terminal pins or the like in accordance with well known constructions in the art. Referring to the second discharge system enclosed within the bulb 16, this comprises a cathode 35 surrounded by a grid 34. The cathode may be connected with the grid supporting wire through the glass bridge 36 and fusion wire 37 corresponding to items 24 and 26, respectively, in Figs. 4 and 6, in case that it is desired to use a distillation cathode formed in a manner as described hereinbefore. During operation, the cathode is heated by radiation from the heater 31 which for this purpose is extended upwards and arranged in one focal line of the anode 38 serving as a heat reflector, the cathode 35 being disposed in the other focal line in a manner similar as described by Figs. 4 to 7. I have further shown the anode connected to a terminal 39 sealed to the top of the tube in a manner well known in the art.

Figure 9:
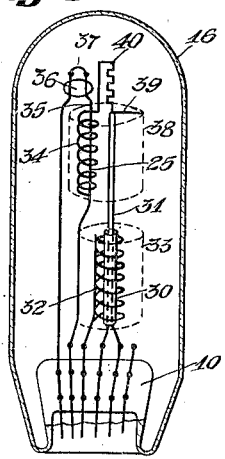
Figs. 9 and 10 show modifications of a composite tube structure as described by Fig. 8.

Fig. 9 shows a further constructional example, wherein the upper system is constructed as a saturating system. For this purpose, it is necessary to use a distillation cathode for the cathode of this upper system. Since the heating body of the upper indirectly heated cathode is independent of the cathode proper and since the cathode itself may be directly heated independently of the normal heating body if necessary for instance during the forming process, it is desirable in certain circumstances when manufacturing distillation cathodes to apply the material to be distilled onto the cathode either to the heating body itself or to a body connected thereto such as a radiation body. The coating material may consist of a mixture of aluminum and barium oxide in which case the so-called thermite process should be employed for the forming of the cathode.

The arrangement shown in Fig. 9 is self-explanatory. The lower three-electrode system comprises a cathode 30 heated by the heater 31 serving for simultaneously supplying the heating for the upper system in a manner similar as described in Fig. 8. As is understood, the lower system need not necessarily be indirectly heated but it is possible to provide a directly heated cathode for the lower system connected in series with the heater for the upper system as disclosed. The upper system again comprises a wire cathode 35 which may be heated either directly or indirectly through the lead 37 and by the heater 31, respectively, in a manner as described hereinbefore. The heating body is placed at anode potential for the purpose as hereinbefore specified in the example shown by means of a direct connection to the anode through connecting lead shown at 39. In this manner, the upper system acts as a very high alternating current resistance without offering an unusually high resistance to the anode direct current provided the cathode is properly designed so that the system shown in Fig. 9, so to speak, contains the anode resistance as well. Although the upper system operates on the saturation principle, whereby a third electrode would not be necessary per se, there is nevertheless provided in the present constructional example a grid which is directly connected to the anode through a comparatively high ohmic resistance 40. The purpose of this grid is as follows: In order to retain the low capacity (which is desired for many purposes) of the upper cathode with respect to the anode, the spacing distance between the anode and cathode should be sufficiently large. However, since a saturation characteristic may only be obtained with a high field strength even with a relatively low voltage between the anode and cathode of the saturation tube, the grid maintained at a positive potential with respect to the cathode, if suitably designed, prevents the capacity between the cathode and anode from increasing largely while, on the other hand, causing a field strength at the surface of the cathode sufficiently high even with small active anode voltage so that the tube can readily be made to operate in the saturation range, resulting in a considerable saving of operating potential.

Figure 10:
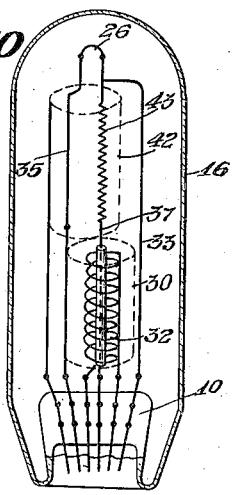

In Fig. 10 another constructional example of a composite tube is shown wherein a saturation characteristic of a system connected in the anode circuit of another (the lower) system is utilized to obtain only a small anode direct current voltage loss for a high alternating current resistance. In this case, however, the system having the saturation characteristic does not work with a saturated discharge requiring a special construction of the cathode, but in order to obtain the saturation characteristic in this case the upper system is so controlled by a special control electrode 42 simultaneously forming the heat reflector, that it behaves like a saturated tube. This can be obtained by supplying the control electrode 42 with a voltage having its place displaced by 180° with respect to the anode voltage of the tube, the necessary controlling voltage increasing in proportion to the effective anode voltage if the trans-conductance of the upper tube increases. However, since, on one hand, for reasons of economy in anode voltage a high trans-conductance is desired, and on the other hand, there is no difficulty in obtaining high controlling voltages when such controlling voltages are derived from the cathode of the lower tube, the external control principle is particularly suitable for the construction of the upper system owing to the high trans-conductance of this type of control. The tube shown in Fig. 10 may be provided, for instance, with a heating body designed for operation from a high voltage, it being possible to conceive this heating body arranged for instance on or in an insulating material body of pure metallic oxide (aluminum oxide, zirconium oxide, magnesium oxide and the like). Due to the high thermal inertia of the carrier of the heating body, fluctuations in radiation caused by supply current fluctuations or by alternating current ripples are suppressed to a practically sufficient extent. The heating body 43 of the upper system may furthermore serve at the same time as a series resistance for a heater or a directly heated cathode of the lower system. The upper system may be given a saturation characteristic as in Fig. 8 or Fig. 9 so that it acts as a coupling resistance for the lower system.

A tube as shown in Fig. 10 is particularly suitable for direct connection to the supply lines since in the first place a high voltage may be applied to the cathode or cathode heating body, and secondly, no special filtering means are required in the case of direct current lines and only a very small amount of filtering by means of smoothing condensers in the case of alternating current lines in that the saturation characteristic is effective in preventing line noises and furthermore allowing low line voltage and high anode voltages to become active at the anode of the lower system when using a high effective coupling resistance.

If the upper system does not work with a saturated cathode but with a filtering action according to Fig. 9, it is possible to secure an effect whereby the system acting as a saturating tube not only is effective in filtering the anode voltage variations but also in compensating the disturbing noises originating from the filament provided the proper adjustment of the control potential and polarization of the heating potential has been made. This is specially useful in case of direct heating of the lower system with direct current having superimposed alternating current ripples or fluctuations.

Since, as has been pointed out on several occasions, owing to the large distance of the cathode heating bodies constructed according to the present application, no capacitive influence need be feared from the other electrodes, the system described here is particularly suitable for cases using high operating voltage between the heating body and cathode; that is, for instance for direct coupled amplifiers of the type described in my above mentioned copending application, and the like.

With pure saturating tubes; that is, wherein the system connected in the anode circuit of another system has a high alternating current resistance due to saturated cathode emission or due to a control action but wherein no constructional elements such as output or intermediate transformers or the like are connected between the anode of the said system and the anode voltage source, it is also possible to use the cathode heating body itself as an anode. In this case, the heating body may then consist for instance of a heating spiral in the axis of which the cathode is situated so that it is exposed to the direct radiation of the heating body. Instead of an ordinary spiral, the heating body in this case may also have the form of a double spiral or any other desired form, no special reflector then being required. Since the emission of the indirectly heated cathode depends to a very substantial extent upon the temperature of the heating body and since therefore saturation is reached with very different emission intensities at different heating body temperatures so that the arrangement is affected upon line fluctuations, it is desirable, particularly in the case of pure saturation tubes, to either use cathode heating bodies which have a high temperature coefficient themselves and therefore automatically effect a regulating action, or else to connect the heating body or transformers in series with iron-hydrogen resistance or the like. A series connection of an iron-hydrogen resistance with a heating body which has a negative temperature coefficient, such as for instance carbon has proved very useful since in this case compensation can be effected so that even with a substantial line voltage the irradiation of the cathode becomes uniform.

Finally, two further constructional examples of tubes with cathodes heated by radiation will be described. Figs. 11 and 12 show a first cathode 47 used directly as a heating body for a second cathode 49, a suitable reflector being provided so that the radiation of one cathode which may be directly heated is concentrated upon the other cathode. In these figures, ellipsoidal reflectors 45 and 46 are provided, a cathode 47 and 48, respectively, being provided in each focal line of the ellipse. Each of these cathodes may either act alternately as heating body or, as may frequently be the case, one cathode may be directly or indirectly heated and the other cathode indirectly heated by radiation from the first cathode. The reflectors 45 and 46 may either be separate reflectors or may act as anode or grid of the associated system, or else have the function of auxiliary elements, for instance, space charge or screen grids or the like. It is only essential that the cathodes, to be heated by radiation, have the lowest possible emission temperature, such as by using oxide or distillation cathodes, and it is highly advantageous as stated hereinbefore to provide the cathode acting as the heating means with a larger surface than the heated cathode. This may be effected in the case of alternate use of two systems as shown in Figs. 11 and 12 as the heating and heated systems, by connecting filaments or parts of filaments to the system effecting the heating at the time.

To complete the tube structure illustrated by Figs. 11 and 12, I have shown the cathodes 47 and 48 surrounded by grid elements 49 and 50 and anodes 51 and 52, respectively, the latter preferably being of foraminous construction such as of grid-shape similar and concentric to the control grids 49 and 50 and having sufficent spacing between successive winding turns to reduce the obstruction of the heat waves radiated from or projected upon the cathodes 47 and 48 to a minimum.

As a final possibility, it should be mentioned that in an arrangement according to Fig. 9 the heating body can be connected to the control grid of this system. This is possible particularly in tubes according to Fig. 9 since the upper grid here is connected similar to the screen grid of a normal screen grid tube, to a fixed potential, and is preferably connected to ground through a condenser so that the ground capacity of the heating source does not offer any drawbacks.

In order to prevent disturbances by natural emission in this system, the means already mentioned may be used severally or in combination. If this grid itself is used for heating, the heating grid is preferably given the form of a spiral surrounding the cathode or some other form surrounding the cathode, the indirectly heated cathode then being provided in the apex of the heating spiral and the energy radiated from the heating spiral thus being directly radiated thereto, while the energy radiated from the outside of the heating spiral is reflected by the concentric anode and also concentrated towards the axis of the heating spiral. For the rest, all the other constructional examples may be combined with this last constructional example.

Referring to Figs. 13 and 14, I have shown a modified arrangement of a tube structure as described in Figs. 11 and 12, the former differing from the latter by the provision of auxiliary reflectors 43 and 44 arranged opposite the main reflectors 45 and 46 to collect and concentrate the heat waves upon the main reflectors 45 and 46 which in the example shown simultaneously serve as anodes for the respective discharge systems.

Although for the forming of indirectly heated cathodes it is desirable in the majority of cases to apply a high temperature at least during manufacture, the application of the inventive idea set forth above is by no means limited to cathodes which are also provided with a device for the direct heating, but the use of the indirect heating by radiation by means of a reflector can be used entirely independently of any such direct heating.

A possibility is the arrangement of a separate tube containing the heating body alone and being provided at the focus or in the focal line of a reflector, while another tube containing the amplifier system is disposed in the focal line of another reflector facing the first reflector in such a manner that the heat rays from one tube are transmitted by radiation to the other tube. In this manner, various systems may also be heated with a single heating source. The reflectors may be arranged either outside or inside of the tube and all the aforementioned variations can be applied, as will be understood.

As is obvious from the above, the invention as described is susceptible of numerous modifications and variations differing from the embodiments illustrated in accordance with the broad underlying spirit and scope of the invention as encompassed by the appended claims.

I claim:

1. In combination with a space discharge system, a plurality of heatable cathodes; means for electrically heating one of said cathodes; and reflecting means for collecting and concentrating heat rays radiated from said last mentioned cathode upon the remaining cathodes to raise said elements to electron emitting temperature.

2. In combination with a space discharge device, a plurality of heatable cathodes; means for electrically heating one of said cathodes to electron emitting temperature; and reflecting means for concentrating heat rays emitted by said heated cathode upon the remaining cathodes to raise said remaining cathodes to electron emitting temperature.

3. In combination with a space discharge system, a first cathode; means for heating the same; a second cathode; an electrode operatively associated with said first cathode; a further electrode operatively associated with said second cathode; said electrodes forming a reflector with said cathodes disposed at the foci of said reflector, whereby said second cathode is heated by radiation from said first cathode.

4. In combination with a space discharge system, a first cathode; a second cathode; a pair of electrodes each being operatively associated with one of said cathodes; means for electrically heating one of said cathodes; and further means whereby said electrodes form a reflector for concentrating heat waves radiated by said heated cathode upon said other cathodes.

5. In combination with a space discharge system, a first elongated cathode; a second elongated cathode; a pair of anodes each operatively associated with one of said cathodes; means for heating said first cathode to electron emitting temperature, said anodes forming an elliptical shaped cylindrical reflector with said cathodes being disposed along the focal lines of said reflector for heating said second cathode by radiation from said first cathode.

6. In combination with a space discharge device, a heatable cathode coated with electronically active material, a heating element with means for heating the same; an anode surrounding said cathode and said heating element, said anode being constructed to form a reflector for concentrating heat rays radiated by said element upon said cathode; and means for increasing the radiation of heat from said element to raise said cathode to electron emitting temperature.

7. In a space discharge device, an oblong cylindrically shaped thermionic electron emitter, a heating element having a shape substantially similar to the shape of said emitter, said heating element being arranged parallel to and spaced apart from said emitter, means for heating said element, a metal sleeve insulatingly enclosing said element, the heat radiating surface of said element being larger than the surface of said emitter, and reflecting means for collecting and concentrating heat rays radiated by said element upon said emitter.

8. In combination with a space discharge device, a heatable cathode, an elongated heating element with means for heating the same; a wire shaped heat radiator spirally wound around said element and electrically insulated therefrom, and reflecting means for concentrating heat rays radiated by said element upon said cathode to raise said cathode to electron emitting temperature.

9. In a space discharge device, an oblong cylindrically shaped thermionic electron emitter, a heating element having a shape substantially similar to the shape of said emitter, said element being arranged parallel to and spaced apart from said emitter and having a radiating surface which is large relative to the electronically active surface of said emitter, means for heating said element, reflecting means for collecting and concentrating heat rays radiated by said element upon said emitter, and a coating of a substance adapted to promote heat radiation applied to said element.

10. In combination with a space discharge device, an elongated thermionic cathode, a heating element with means for heating the same, said heating element being of substantially similar configuration as said cathode and having a mass and a radiating surface which is large relative to the mass and emitting surface of said cathode, a cylindrical reflector of elliptical cross section, said cathode and heating element being arranged parallel to each other and along the focal lines of said reflector.

11. A space discharge device as claimed in claim 10 in which the distance between said cathode and said heater is less than the length of either.

12. In a space discharge device, a thermionic emitter, a heating element having a shape substantially similar to the shape of said emitter but with increased mass and heat radiating surface compared with the mass and surface of said emitter, said heating element being spaced apart from said emitter, means for heating said element, reflecting means for concentrating heat rays radiated from said element upon said emitter, and means for promoting heat radiation and simultaneously decreasing electron emission from said heating element.

13. In a device as claimed in claim 12 wherein said last means consists of a coating of carbon applied to said heating element.

14. In combination with a space discharge device, an elongated heating element of electrically insulating material, an electron emitter applied to the outside of said heating element, an electric heater winding embedded in said heating element and adapted to heat said emitter indirectly through said heating element, and means for directly passing an electric heating current through said emitter.

15. In combination with a space discharge device, an elongated heating element of electrically insulating material, a thermionic emitter comprising a spiral conductor wound around said heating element, an electric heater winding embedded in said heating element adapted to heat said emitter indirectly through said heating element, and means for directly passing an electric heating current through said conductor.

16. In a composite space discharge device comprising at least two separate discharge paths, heatable cathodes for said paths, means for directly heating the first cathode, and further means whereby the second cathode is heated by heat rays radiated from said first cathode, to maintain both cathodes at electron emitting temperature.

17. In a space discharge device, a thermionic cathode, a heating element arranged in spaced relation to said cathode, heat reflecting means, means for directly heating said element, said element and said cathode being arranged at the foci of said reflecting means, said element having a substantially similar configuration as said cathode and a mass and radiating surface which is large relative to the mass and surface of said cathode, whereby said cathode may be adjusted within the focal zone of the heat rays radiated from said heater to apply maximum heat to said cathode and to maintain said cathode at electron emitting temperature.

18. In a space discharge device, a thermionic cathode, a heater element, at least one further electrode arranged in spaced relation to said cathode and adapted to form a cylindrical reflector, said heater element and said cathode being arranged at the foci of said reflector, said heater element having a substantially similar configuration as said cathode and a mass and radiating surface which is large compared with the mass and surface of said cathode, whereby said cathode may be adjusted within the focal zone of the heat rays radiated from said heater to apply maximum heat from said heater to said cathode and to maintain said cathode at electron emitting temperature.

LEON LADISLAS DE KRAMOLIN.